United States Patent Office 2,842,560
Patented July 8, 1958

2,842,560

AMINOALKYL ESTERS OF 12-KETO-10,11-OCTA-DECENOIC ACID AND 12-KETO-10,11-EPOXY-STEARIC ACID

Joseph Nichols, Princeton, and Edgar S. Schipper, New Brunswick, N. J., assignors to Ethicon, Inc., a corporation of New Jersey No Drawing. Application May 5, 1955
Serial No. 506,354

7 Claims. (Cl. 260—348)

This invention relates to esters of 12-keto-10,11-octadecenoic acid and 12-keto-10,11-epoxystearic acid, and more particularly relates to dialkylaminoalkyl esters of 12-keto-10,11-octadecenoic acid and 12-keto-10,11-epoxystearic acid.

U. S. Patent No. 2,623,888, December 30, 1952, discloses the prepartion of 12-keto-10,11-octadecenoic acid by the isomerization of 12-ketooleic acid or 12-ketoelaidic acid. 12-keto-10,11-epoxystearic acid and 12-keto-10,11-dihydroxystearic acid may be prepared by the oxidation of 12-keto-10,11-octadecenoic acid with hydrogen peroxide. Oxidation with hydrogen peroxide leading to the production of 12-keto-10,11-epoxystearic acid is conducted in an alkaline medium at a low temperature and is preferably conducted at a temperature not above −5° C. in the presence of magnesium chloride which acts as a catalyst. Oxidation with hydrogen peroxide leading to the production of 10,11-dihydroxy-12-ketostearic acid is conducted in solution in anhydrous tertiary butyl alcohol or in solution in anhydrous ether in the presence of a catalytic amount of osmium tetroxide, and preferably at a temperature not exceeding 50° C.

The novel dialkylaminoalkyl esters of 12-keto-10,11-octadecenoic acid and 12-keto-10,11-epoxystearic acid of this invention may be prepared by reacting equi-molar amounts of the acid and a lower alkyl chloroformate such as isobutylchloroformate, ethylchloroformate, or propylchloroformate in the presence of an equi-molar amount of a lower aliphatic tertiary amine, an acylalkylcarbonate resulting from the reaction. The reaction is conducted at a temperature below 0° C. and in the presence of an inert solvent such as tetrahydrofuran or toluene. The addition of about one to two moles of an alcohol and about one mole of a tertiary amine to the reaction mixture containing the acylalkylcarbonate results in the formation of the desired ester.

The novel esters of this invention have the following general structure:

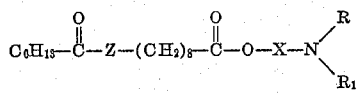

in which X is a lower alkylene straight or branched-chain radical and preferably having two to four carbon atoms, R and R₁ are each a lower alkyl radical and preferably having not more than four carbon atoms and Z is a vinylene or epoxyethylene radical.

For the purpose of illustration, the following examples are set forth to illustrate the preparation of the novel compounds of the invention but are not to be construed as limiting the spirit of the invention or its scope.

EXAMPLE I

*Alpha - methyl - delta - diethylaminobutyl - 12 - keto-10,11-octadecenoate*

4.11 grams of isobutylchloroformate were added dropwise to a stirred solution of 8.88 grams of 12-keto-10,11-octadecenoic acid and 3.0 grams of triethylamine in 300 ml. of dry toluene, the temperature during addition being maintained at −5° C. to −10° C. The reaction mixture was maintained at the same temperature and stirred for thirty minutes. A solution of 9.6 grams of alpha-methyl-delta-diethylaminobutanol and 3.06 grams of triethylamine in 10 ml. of toluene were then added to the above solution and the reaction mixture was refluxed for thirty minutes. The triethylaminehydrochloride which was formed was removed by filtration and the filtrate was concentrated to dryness under reduced pressure. The oily residue resulting from concentration to dryness was dissolved in 100 ml. of 3-normal-hydrochloric acid and the solution was allowed to fall through a 1-foot column containing 250 ml. of ether. The acidic solution was treated with animal charcoal and then neutralized at 0° C. with a ten percent solution of potassium hydroxide. The neutralized solution was extracted with two 250 ml. portions of ether and the ether layers were combined, washed with water and dried over sodium sulfate. The sodium sulfate was removed by filtration and the ether solution was evaporated under reduced pressure and the residue was distilled at a pressure of 0.04 mm. of mercury. 4.8 grams of a fraction boiling at 205° C. to 210° C. and having a refractive index at 28° C. of 1.4623 were obtained.

Calculated for $C_{27}H_{52}O_3N$: Carbon=74.09%; hydrogen=11.75%. Found: Carbon=74.25%; hydrogen=11.71%.

EXAMPLE II

*Gamma-dibutylaminopropyl-12-keto-10,11-octadecenoate*

4.11 grams of isobutylchloroformate were added dropwise to a stirred solution of 8.88 grams of 12-keto-10,11-octadecenoic acid and 3.06 grams of triethylamine in 300 ml. of dry toluene, the temperature during addition being maintained at −5° C. to −10° C. The reaction mixture was maintained at the same temperature and stirred for thirty minutes. A solution of 11.3 grams of gamma-dibutylaminopropanol and 3.06 grams of triethylamine in 10 ml. of toluene were then added to the above solution and the reaction mixture was refluxed for thirty minutes. The triethylamine hydrochloride which formed was removed by filtration and the filtrate was concentrated to dryness under reduced pressure. The oily residue resulting from concentration to dryness was dissolved in 100 ml. of 3-normal-hydrochloric acid and the solution was allowed to fall through a 1-foot column containing 250-ml. of ether. The acidic solution was treated with animal charcoal and then neutralized at 0° C. with a ten percent solution of potassium hydroxide. The neutralized solution was extracted with two 250 ml. portions of ether and the ether layers were combined, washed with water and dried over sodium sulfate. The sodium sulfate was removed by filtration and the ether solution was evaporated under reduced pressure and the residue was distilled at a pressure of 0.04 mm. of mercury. 7.2 grams of a fraction boiling at 220° C. to 225° C. and having a refractive index at 33° C. of 1.4571 were obtained.

Calculated for $C_{29}H_{55}O_3N$: Carbon=74.78%; hydrogen=11.90%. Found: Carbon=74.77%; hydrogen=12.09%.

EXAMPLE III

*Beta-diethylaminoethyl-12-keto-10,11-octadecenoate*

4.11 grams of isobutylchloroformate were added dropwise to a stirred solution of 8.88 grams of 12-keto-10,11-octadecenoic acid and 3.06 grams of triethylamine in 300 ml. of dry toluene, the temperature during addition being maintained at −5° C. to −10° C. The reaction mixture was maintained at the same temperature and stirred for thirty minutes. A solution of 7.05 grams of diethylaminoethanol and 3.06 grams of triethylamine in 10 ml. of toluene was added to the above solution and the reaction mixture was refluxed for fifteen minutes. The triethylamine hydrochloride which formed was removed by filtration and the filtrate was concentrated to dryness under reduced pressure. The oily residue resulting from concentration to dryness was dissolved in 100 ml. of 3-normal-hydrochloric acid and the solution was allowed to fall through a 1-foot column containing 250 ml. of ether. The acidic solution was treated with animal charcoal and then neutralized at 0° C. with a ten percent solution of potassium hydroxide. The neutralized solution was extracted with two 250 ml. portions of ether and the ether layers were combined, washed with water and dried over sodium sulfate. The sodium sulfate was removed by filtration and the ether solution was evaporated under reduced pressure and the residue was distilled at a pressure of 0.03 mm. of mercury. 7.5 grams of a fraction boiling at 195° to 200° C. were obtained.

Calculated for $C_{24}H_{45}O_3N$: Carbon=72.86%; hydrogen=11.47%. Found: Carbon=73.16%; hydrogen=11.41%.

EXAMPLE IV

*Gamma-diethylaminopropyl-12-keto-10,11-epoxystearate*

4.11 grams of isobutylchloroformate were added dropwise to a stirred solution of 9.36 grams of 12-keto-10,11-epoxystearic acid and 3.06 grams of triethylamine in 300 ml. of dry toluene, the temperature during addition being maintained at −5° C. to −10° C. The reaction mixture was maintained at the same temperature and stirred for thirty minutes. A solution of 7.02 grams of gamma-diethylaminopropanol and 3.06 grams of triethylamine in 10 ml. of toluene was added to the above solution and the reaction mixture was refluxed for thirty minutes. The triethylamine hydrochloride which formed was removed by filtration and the filtrate was concentrated to dryness under reduced pressure. The oily residue resulting from concentration to dryness was dissolved in 100 ml. of 3-normal-hydrochloric acid and then treated with animal charcoal. The mixture was filtered and the filtrate was neutralized at 0° C. with a ten percent solution of potassium hydroxide. The oil was extracted with two 250 ml. portions of ether and the ether layers were combined, washed with water and dried over sodium sulfate. The sodium sulfate was removed by filtration and the ether solution was evaporated to dryness under reduced pressure and the residue was distilled at at pressure of 0.04 mm. of mercury. 7.8 grams of a fraction boiling at 205° C. to 210° C. were obtained.

Calculated for $C_{25}H_{47}O_4N$: Carbon=70.54%; hydrogen=11.13%. Found: Carbon=70.66%; hydrogen=11.35%.

EXAMPLE V

*Beta-dimethylaminoethyl-12-keto-10,11-epoxystearate*

4.11 grams of isobutylchloroformate were added dropwise to a stirred solution of 9.36 grams of 12-keto-10,11-epoxystearic acid and 3.06 grams of triethylamine in 300 ml. of dry toluene, the temperature during addition being maintained at −5° C. to −10° C. The reaction mixture was maintained at the same temperature and stirred for thirty minutes. A solution of 5.4 grams of dimethylaminoethanol and 3.06 grams of triethylamine in 10 ml. of toluene was added to the above solution and the reaction mixture was refluxed for fifteen minutes. The triethylamine hydrochloride which formed was removed by filtration and the filtrate was concentrated to dryness under reduced pressure. The oily residue resulting from concentration to dryness was dissolved in 100 ml. of 3-normal-hydrochloric acid and the solution was allowed to fall through a 1-foot column containing 250 ml. of ether. The acidic solution was treated with animal charcoal and then neutralized at 0° C. with a ten percent solution of potassium hydroxide. The neutralized solution was extracted with two 250 ml. portions of ether and the ether layers were combined, washed with water and dried over sodium sulfate. The sodium sulfate was removed by filtration and the ether solution was evaporated under reduced pressure and the residue was distilled at a pressure of 0.04 mm. of mercury. 2.7 grams of a fraction boiling at 210° to 215° C. and having a refractive index at 24° C. of 1.4601 were obtained.

Calculated for $C_{22}H_{41}O_4N$: Carbon=68.89%; hydrogen=10.77%. Found: Carbon=68.51%; hydrogen=10.66%.

The novel compounds of this invention are highly effective at low concentration in killing microorganisms or preventing or inhibiting their growth.

EXAMPLE VI

Beta-diethylaminoethyl-12-keto - 10,11 - octadecenoate and gamma - diethylaminopropyl-12-keto-10,11-epoxystearate were tested for bactericidal activity by the following serial dilution method:

The compounds were sterilized by exposure to propylene oxide for three days and 0.5 milliliters of sterile aqueous solution containing twenty micrograms of compound per milliliter of solution was added to 9.5 milliliters of sterile yeast beef broth, the broth then being serially diluted with additional sterile broth to provide solutions of five milliliters total volume containing 100, 50, 1, 0.1, and 0.01 micrograms of compound per milliliter of solution. Three tubes, each containing 4.5 milliliters of sterile broth, were inoculated with 0.1 milliliter of a mature broth culture of *Bacillus subtilis*, *Diplococcus pneumoniae* III, and *Micrococcus pyogenes* var. *aureus*, respectively, and the inoculated tubes were incubated at 37° C. for 24 hours. Three tubes, each containing 4.5 milliliters of sterile broth, were each inoculated with 0.1 milliliter of an incubated culture and incubated at 37° C. for 24 hours. Progressive series of dilutions ranging from 1 to 100, to 1 to 1 billion, were prepared by dilution of the contents of the three tubes with sterile broth and 0.1 milliliter of each dilution was transferred into 4.5 milliliters of sterile broth and incubated at 37° C. for 24 hours. 0.1 milliliter of the contents of the tubes representing the highest dilution which initiated growth of the organism were each transferred into each of the tubes containing the compounds to be tested and this was followed by incubation of the tubes at 37° C. for 48 hours. The table below gives the results of the tests by serial dilution in column I, the values being the concentrations in micrograms per milliliter at which growth was inhibited.

Beta-diethylaminoethyl-12-keto - 10,11 - octadecenoate and gamma - diethylaminopropyl-12-keto-10,11-epoxystearate were tested for activity against *Coccidioides immitis* by a serial dilution method given by the following procedure:

The compounds were sterilized by exposure to propylene oxide for three days and 0.25 milliliter of sterile aqueous solution containing twenty micrograms of compound per milliliter of solution was added to 4.5 milliliters of sterile Mycophil broth, the broth then being serially diluted with additional sterile broth to provide solutions of five milliliters total volume containing 500, 100, 10, 1, 0.1, and 0.01 micrograms of compound per milliliter of solution. One milliliter of a seventy-two hour Mycophil broth culture of *Coccidioides immitis* was added to ninety-nine milliliters of sterile Mycophil broth and 0.2 milliliters of diluted culture was added to each of the serial dilutions containing the test compound and the inoculated tubes were incubated at 25° C. for five days. The table below gives the results of the tests in column II, inhibiting concentrations being expressed in micrograms per milliliter where obtained.

Table

| | Column I | | | Column II |
|---|---|---|---|---|
| | Bacterial Inhibiting Activity | | | Fungal Inhibiting concentration |
| | B. Subtilis | D. Pneumoniae III | M. Pyogenes var. Aureus | Coccidioides Immitis |
| Beta - diethylamino - ethyl - 12 - keto - 10, 11-octadecenoate | 50 | 50 | 50 | 10 |
| Gamma - diethylamino - propyl - 12 - keto - 10, 11-epoxystearate | 50 | 50 | 50 | 50 |

What is claimed is:

1. New and useful compounds having the formula:

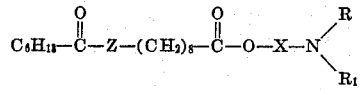

in which X is a lower alkylene radical, R and $R_1$ are each a lower alkyl radical and Z is a member selected from the class consisting of vinylene and epoxyethylene radicals.

2. New and useful compounds according to claim 1 in which X is a lower alkylene radical having at least two but not more than four carbon atoms and R and $R_1$ are each an alkyl radical having not more than four carbon atoms.

3. Alpha - methyl - delta - diethylaminobutyl-12-keto-10,11-octadecenoate.

4. Gamma - dibutylaminopropyl - 12 - keto - 10,11-octadecenoate.

5. Beta - diethylaminoethyl-12-keto-10,11-octadecenoate.

6. Gamma - diethylaminopropyl - 12 - keto - 10,11-epoxystearate.

7. Beta - dimethylaminoethyl - 12 - keto-10,11-epoxystearate.

References Cited in the file of this patent

UNITED STATES PATENTS

| 2,430,004 | De Groote | Nov. 4, 1947 |
| 2,623,888 | Nichols | Dec. 30, 1952 |

OTHER REFERENCES

Vaughn, Jr.: J. Am. Chem. Soc., vol. 73 (1951), page 3547.

Emery et al.: J. Chem. Soc. (1950), pages 1443–1460.